US008253654B2

(12) United States Patent
Alberth, Jr.

(10) Patent No.: US 8,253,654 B2
(45) Date of Patent: Aug. 28, 2012

(54) VISUAL INTERFACE CONTROL BASED ON VIEWING DISPLAY AREA CONFIGURATION

(75) Inventor: William P. Alberth, Jr., Crystal Lake, IL (US)

(73) Assignee: Motorola Mobility LLC, Libertyville, IL (US)

( * ) Notice: Subject to any disclaimer, the term of this patent is extended or adjusted under 35 U.S.C. 154(b) by 819 days.

(21) Appl. No.: 11/687,314

(22) Filed: Mar. 16, 2007

(65) Prior Publication Data

US 2008/0224948 A1 Sep. 18, 2008

(51) Int. Cl.

*G09G 3/00* (2006.01)
*G09G 5/00* (2006.01)
*G09G 3/34* (2006.01)
*G09G 5/02* (2006.01)
*G09B 5/00* (2006.01)

(52) U.S. Cl. .......... 345/31; 345/156; 345/108; 345/204; 345/660; 345/699; 345/1.1; 434/317

(58) Field of Classification Search ............ 345/1.1–1.3, 345/30, 55, 76–77, 156, 173, 175, 184, 204, 345/698–699, 31, 108, 660; 434/317, 308–309
See application file for complete search history.

(56) References Cited

U.S. PATENT DOCUMENTS 5,463,422 A * 10/1995 Simpson et al. ........... 348/390.1
5,609,488 A * 3/1997 McTaggart .................... 434/317
6,297,805 B1 * 10/2001 Adler et al. ................... 345/158
6,453,155 B1 9/2002 Hill et al.
6,643,124 B1 11/2003 Wilk
6,734,305 B2 5/2004 Pierre et al.
6,771,237 B1 * 8/2004 Kalt ................................ 345/85
7,030,855 B2 4/2006 Metcalf
7,034,802 B1 4/2006 Gettemy et al.
7,095,387 B2 8/2006 Lee et al.
2002/0000970 A1 1/2002 Akimoto et al.
2003/0048256 A1 3/2003 Salmon
2003/0071832 A1 * 4/2003 Branson ........................ 345/698
2003/0098857 A1 5/2003 Gettemy et al.
2003/0109286 A1 6/2003 Hack et al.
2003/0160735 A1 8/2003 Lee et al.
2004/0189709 A1 9/2004 Halstead, Jr.
2004/0218127 A1 11/2004 Miura
2005/0110702 A1 * 5/2005 Aoki et al. ...................... 345/30

(Continued)

FOREIGN PATENT DOCUMENTS

EP 0899651 A2 3/1999

(Continued)

OTHER PUBLICATIONS

Dr. Mike Cooke; http:www/fabtech.org/content/view/2327; Jan. 5, 2007; 3 pages.
John Blau, IDG News Service; http://www.bio-itworld.com/newsitems/s005/01/011305_report7142.html.news; Apr. 30, 2006; 3 pages.
Patent Cooperation Treaty, "PCT Search Report and Written Opinion of the International Searching Authority" for International Application No. PCT/US2008/051547 Jun. 12, 2008, 13 pages.
Patent Cooperation Treaty, "PCT Search Report and Written Opinion of the International Searching Authority" for International Application No. PCT/US2008/051546 Jun. 6, 2008, 14 pages.

(Continued)

*Primary Examiner* — Lun-Yi Lao
*Assistant Examiner* — Jarurat Suteerawongsa
(74) *Attorney, Agent, or Firm* — Stephen H. Shaw

(57) ABSTRACT

A visual interface having a plurality of picture elements disposed on a substrate wherein a viewable display area of the visual interface may be configured by expanding or contracting the substrate in at least one dimension, and a characteristic of the visual interface is controlled based on the configuration of the viewable display area.

20 Claims, 3 Drawing Sheets

U.S. PATENT DOCUMENTS

| | | | | |
|---|---|---|---|---|
| 2006/0107566 | A1 | 5/2006 | Van Rens | |
| 2006/0133047 | A1 | 6/2006 | Tomizuka et al. | |
| 2006/0209246 | A1 | 9/2006 | Kim | |
| 2007/0097108 | A1 * | 5/2007 | Brewer | 345/204 |
| 2008/0224951 | A1 | 9/2008 | Alberth | |

FOREIGN PATENT DOCUMENTS

| | | | |
|---|---|---|---|
| EP | 1724742 | A1 * | 11/2006 |
| WO | 02057843 | A2 | 7/2002 |
| WO | 2004053818 | A1 | 6/2004 |

OTHER PUBLICATIONS

USPTO, “Non-Final Rejection” U.S. Appl. No. 11/687,229 Dec. 28, 2009, 25 pages.

“Response to Non-Final Rejection” U.S. Appl. No. 11/687,229 Apr. 19, 2010, 14 pages.

USPTO, “Final Rejection” U.S. Appl. No. 11/687,229 Jul. 8, 2010, 19 pages.

* cited by examiner

VISUAL INTERFACE CONTROL BASED ON VIEWING DISPLAY AREA CONFIGURATION

The present disclosure relates generally to visual display technology, and more specifically to controlling characteristics of a visual interface based on a viewable display area configuration thereof.

BACKGROUND

Portable electronic devices including cellular telephone handsets, personal digital assistants (PDAs), handheld gaming devices, and laptop computers, among other devices, have become increasingly popular, particularly in mobile societies. Consumer demand for portability however is often at odds with a competing desire for large display interfaces, since small devices severely constrain the size of the display that may be incorporated into such devices.

Others have endeavored to address competing demands for small form-factors and large display areas. For example, U.S. Pat. No. 7,095,387 entitled "Display Expansion Method and Apparatus" discloses an expandable display having multiple folding sections in a handheld computing device, wherein the display is expandable upon unfolding the multiple display sections. An alternative embodiment includes a retractable e-paper display screen that is supported by a folding panel that may be expanded. The '387 Patent also teaches reformatting a displayed image based on the configuration of the display to maintain a constant display resolution regardless of the configuration of the display.

The various aspects, features and advantages of the disclosure will become more fully apparent to those having ordinary skill in the art upon careful consideration of the following Detailed Description thereof with the accompanying drawings described below. The drawings may have been simplified for clarity and are not necessarily drawn to scale.

DETAILED DESCRIPTION

Figure 1:
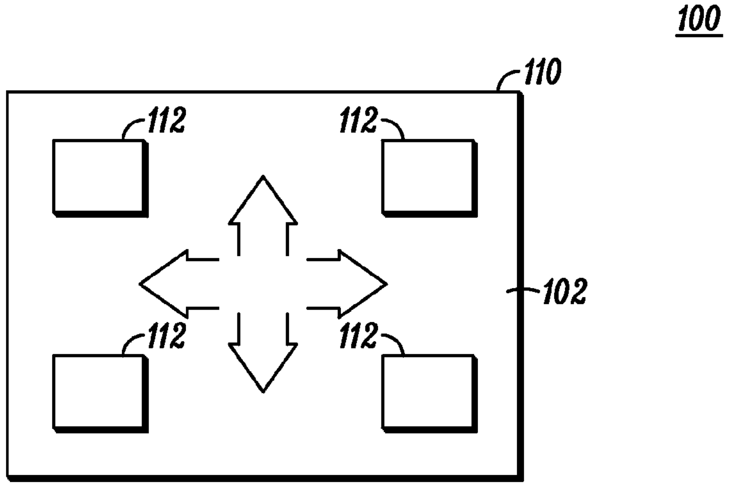
FIG. 1 illustrates a visual interface, or display, having a first area configuration.

In FIG. 1, a visual interface 100 comprises a substrate 110 having a side forming a viewable display area 102 defining a surface dimension. The substrate generally includes a plurality of addressable picture elements (pixels) 112 disposed, for example, in an array, on the side thereof forming the viewable display area. The visual interface may be implemented as a display that provides textual and graphical information. The visual interface may also be a combined display and user input interface. The visual interface is suitable for a portable electronic device and non-portable applications.

In FIG. 1, while the illustrated visual interface includes only four pixels, the display could also comprise a relatively large number of such elements. The picture elements (pixels) are addressable by a controller as discussed below. Also, while each picture element comprises at least one constituent element, individual picture elements may be aggregated to define a composite picture element. In other words, a picture element comprising a plurality of constituent picture elements. In FIG. 1, for example, three of the picture elements 112 may be aggregated to form a Red, Blue & Green (RGB) color picture element. In other embodiments, a White picture element may be added to form an RGBW picture element. Thus in FIG. 1, the three or four individual picture elements 112 may constitute a single color picture element. It is also possible for neighboring color picture elements to share individual elements. The picture elements may be discrete components disposed on the substrate or the picture elements may be an integral part of the substrates. Exemplary substrates are discussed below.

Generally, the substrate comprises a structure that is configurable between at least two different viewable display area configurations. The viewable display area is a portion of the visual interface or display visible to the user. The viewable display area also has a surface dimension that is defined generally by the pixels disposed on the substrate. In one embodiment, the surface dimension of the display is planar. In other embodiments, however, the surface dimension of the display may be curved, for example, concave or convex. According to one aspect of the disclosure, the size and/or shape of the visual interface and particularly the viewable display area thereof is configurable. In one application, first and second viewable display area configurations of the visual interface have different size viewable display areas. In another application, the first and second viewable display area configurations have different shapes with the same size area. The size and/or shape of the viewable display area may be configured by an application or by the user as discussed more fully below.

Figure 2:
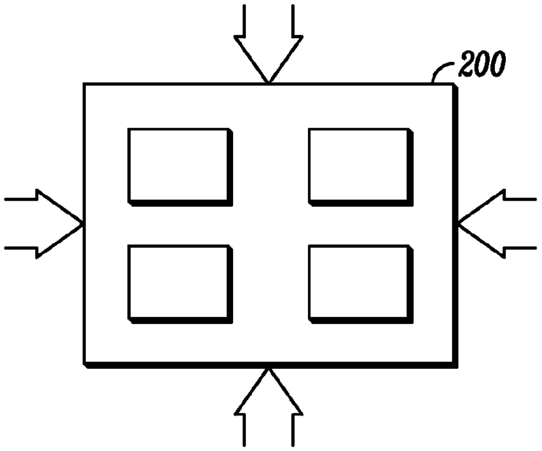
FIG. 2 illustrates a display having a second area configuration.

FIG. 1 illustrates the display 100 having a first size configuration having a greater area than a second size configuration of the display 200 illustrated in FIG. 2. The displays illustrated in FIGS. 1 and 2 have been re-configured in 2-dimensions, such that the display area in FIG. 1 is greater than the display area of FIG. 2. In FIGS. 1 and 2, the area of the visual interface is configured or changed by expansion and contraction of the substrate in one or more directions, as indicated by the arrows. In other embodiments, however, the substrate area may be expanded or contracted along only one direction, for example, the substrate could be extended and contracted only laterally or only vertically. Also, the configuration of the substrate may be changed without changing the size of the viewable display area. For example, the visual interface could be configured between landscape and portrait configurations, wherein both configurations have the same viewable display area.

In one embodiment, the substrate comprises an elastic component that may be expanded and contracted. In FIGS. 1 and 2, the display is reconfigured by expanding and contracting the elastic component, wherein a predominant component of the expansion and contraction of the substrate is substantially parallel to the surface dimension of the viewable display area, as indicated by the arrows. Thus in one embodiment, the substrate is stretched in a first viewable display area configuration and the substrate is contracted in a second viewable display area configuration.

In a more particular embodiment, the elastic component is the substrate per se. Exemplary elastic materials suitable for forming an elastic substrate include elastic polymers among other natural and synthetic materials having elastic properties. The elastic substrate may also be embodied as an elastic fabric capable of being stretched and contracted to increase and decrease the size and/or shape of the substrate. In these implementations, the elastic substrate expands and contracts parallel to the surface dimension of the viewable display area. In this implementation, the substrate may also be considered to lie within the surface of the viewable display area. In some implementations, the height or vertical dimension of the elastic substrate may have a tendency to decrease as the substrate is stretched. It is also expected that the substrate could be a three dimensional substrate, which will stretch in three dimensions.

Figure 3:
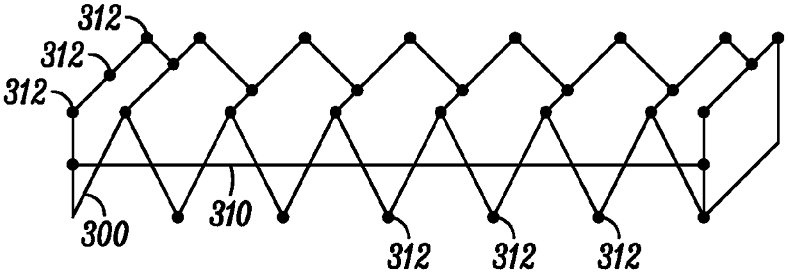
FIG. 3 illustrates a display having a configurable viewable surface area.

In another implementation, the substrate comprises a structure formed of overlapping elements interconnected by an elastic component. FIG. 3 illustrates a substrate comprising an expandable pleated material 300 having portions interconnected by one or more elastic strands 310. While the one or more elastic strands are illustrated extending through a medial portion of the pleated material 300, the strands could also be disposed on the top and/or bottom thereof. The pleated material is biased toward a more folded or collapsed configuration and may be expanded to increase the viewable display area upon stretching the elastic strands, thereby unfolding the pleated material. In this embodiment, the elastic component includes one or more elastic strands that are stretched and contracted substantially parallel to the surface of the viewable display area. The strand may also be considered to be within the plane or surface of the viewable display area depending upon where the pixels are located on the substrate. In this embodiment, the viewable display area may be expanded and contracted in at least one dimension. A more complex substrate folding topology would be required to expand and contract the viewable display area in two dimensions using arrays of elastic strands oriented orthogonally.

In another embodiment, not illustrated, the substrate structure comprises interleaved or overlapping shingle-like elements interconnected by elastic strands. The shingle-like elements may be formed of an elastic or non-elastic material. The shingle-like elements may be discrete elements or they may be interconnected by a flexible web. In one implementation, the elongated shingle-like elements are interconnected by elastic strands that bias the elements in a partially overlapping collapsed configuration. The elements may be fanned-out to increase the viewable display area by stretching the elastic strands. A single array of overlapping shingle-like elements extending the full length or width of the display and interconnected by elastic strands or other elastic elements could be extended and collapsed in one dimension. An array of overlapping shingle-like elements interconnected by orthogonal elastic strands could be extended and collapsed in two dimensions. The substrate and pixels may also be implemented as e-paper having an elastic property, or by islands of e-paper disposed on an elastic substrate. In one embodiment, e-ink is deposited on a conductive elastomeric material.

In one embodiment, the picture elements are embodied as light emitting diodes (LEDs) disposed on the substrate. For example, the LEDs may be fastened to the substrate using a conductive adhesive, or by soldering or by other suitable means. Alternatively, the LEDs may be formed integrally with or on the substrate using printing and/or lithography techniques. Integral implementations of the substrate and the picture elements may be embodied as plastic semiconductors. The pixels could also be implemented with transistors as in a TFT, or with MEMs utilized as shutters or mirrors disposed on an elastic substrate. For example, the pixels 112 in FIG. 1 could be clusters or islands of LCD pixels arranged on an elastic substrate. In FIG. 3, pixels 312 may be located on the troughs and/or ridges of the pleated material, or therebetween. In the shingle-like substrate example, one or more pixels may be located on each element. The pixels could be coupled to the elastic conductors using conductive glue or solder or they could be printed on at least some of the exemplary substrate materials.

The picture elements may be electrically interconnected, for example, to an electrical interface or other components by elastic conductors. The elastic conductor may comprise a conductive core and an insulating sheath. The core could be a silver impregnated rubber or some other elastic material with a conductive doping or conductive properties. The insulating sheath could be any compatible elastic material with suitable insulating properties. In one embodiment, the elastic conductor is integrated with the substrate, for example, by weaving it into an elastic fabric or integrating the elastic conductor with a discrete substrate component. In another embodiment, the substrate is woven or otherwise created from elastic strands, at least some of which are conductors, thus forming a stretchable sheet of substrate or an elastic fabric as discussed above. In embodiments where the substrate and the picture elements are integrally formed of an elastic semiconductor, the leads could also be printed using lithographic techniques.

Figure 4:
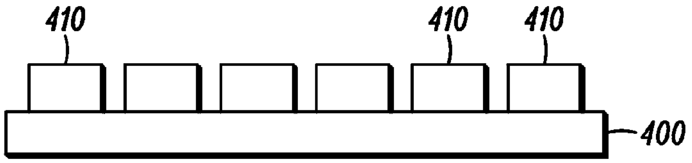
FIG. 4 illustrates a sectional view of a display having a first area configuration.
Figure 5:
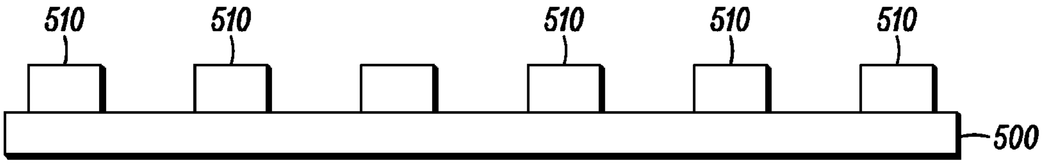
FIG. 5 illustrates a sectional view of a display having a second area configuration.

FIG. 4 is a side or sectional view of a substrate 400 having a plurality of pixels 410 disposed thereon in a contracted configuration. In FIG. 5, the substrate 500 is in an expanded configuration, wherein spacing among the picture elements 510 is relatively far apart compared to the spacing in FIG. 4. In this implementation, the density of the picture elements on the substrate is dependent on the configuration of the substrate. In other embodiments, however, the pixel density on the substrate may not necessarily change. In some applications, the changing density of the picture elements as the substrate is configured may provide some opportunities to control and/or address the picture elements differently, as discussed further below.

Figure 6:
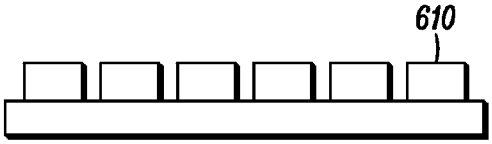
FIG. 6 illustrates a sectional view of another display having a first area configuration.
Figure 7:
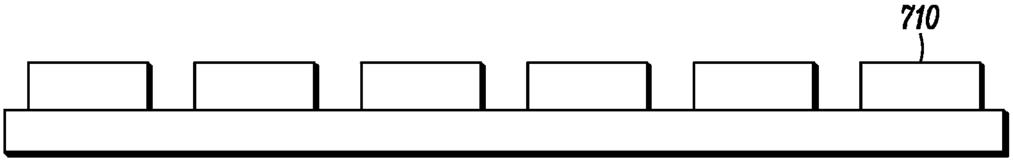
FIG. 7 illustrates a sectional view of another display having a second area configuration.

In some embodiments, the plurality of picture elements have an elastic characteristic, wherein the size of each picture element changes in some proportion to the size of the underlying substrate. In FIG. 6, the substrate is contracted and in FIG. 7 the substrate is extended or expanded. In FIGS. 6 and 7, the picture elements comprise an elastic characteristic, wherein the picture elements expand when the substrate is expanded and the picture elements contract when the substrate contracts. Thus the picture elements 610 in FIG. 6 have less width than the picture elements 710 in FIG. 7 since the picture elements in FIG. 7 have been expanded or extended. The density of the picture elements on the substrate is also dependent on the configuration of the substrate. The pitch or spacing between picture elements does not vary as much when elastic picture elements are used as it does for non-elastic elements. Also, in some implementations, as the picture elements are extended in one or more dimensions, there may be a tendency for the height or vertical dimension of the picture elements to decrease.

Figure 8:
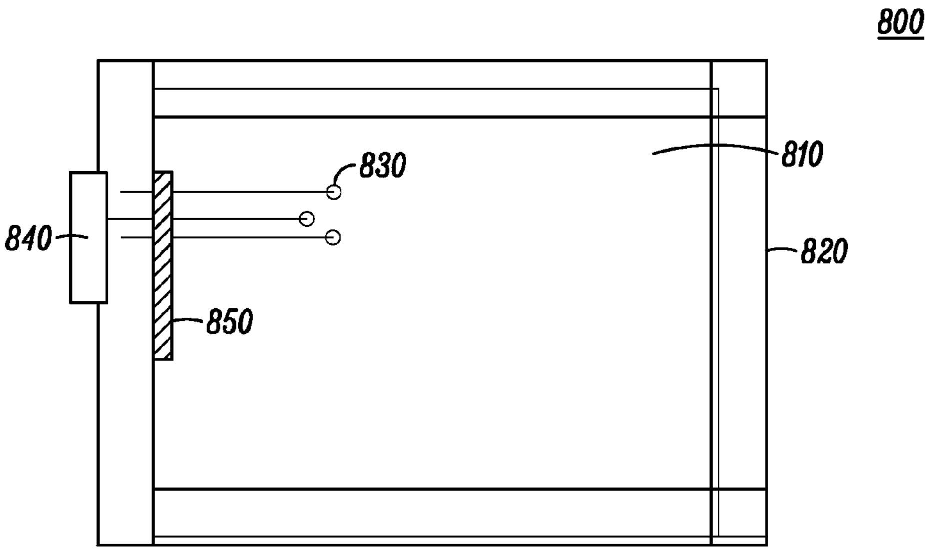
FIG. 8 illustrates a visual interface.

FIG. 8 illustrates a visual interface or display assembly 800 that is suitable for integration in an electronic device. The display includes a configurable substrate 810 captured or otherwise retained in an expandable frame. Picture elements 830 embedded in the substrate are electrically coupled to an electrical interface 840 via electrical conductor 820. In one embodiment, the interface comprises a mechanical connector that secures electrical contacts to a mating interface. In another embodiment, the interface is a wireless interface that communicates with another entity, which may host a display controller. Alternatively, a display controller 850 may be integrated with the visual interface, wherein the interface 840 couples the controller to another entity, for example, to an entity located on a host device. In this latter embodiment, the display controller is electrically coupled to and drives the picture elements.

In one embodiment, the configuration of the visual interface may be changed by configuring or re-configuring the adjustable frame. The frame may be configured manually or automatically. In one embodiment, the size and or shape of the frame is changed hydraulically or with servo-motors. The display may be configured automatically based on opening or closing a particular software application. For example, it may be desirable to increase the size of the visual interface when viewing a video clip or image. It may also be desirable to view certain content in a landscape orientation, or to view movie content in a 16:9 display format. The display configuration could be changed to a default configuration upon closing the application, or changed to a default configuration when the device is powered off. Also, the user may be empowered to ultimately control the configuration of the display and may be allowed to override any automatic display configurations. Such control could be exercised by the user at a control interface of the host device.

In another embodiment, the display comprises a material that changes size and/or shape in response to an applied electrical signal. In one embodiment, for example, the substrate includes an electro-active polymer (EAP). In one application, the display size and/or shape of the display is changed by applying power to the EAP. An EAP material may also be used to detect changes in the size and/or shape of the substrate. For example, one or more EAP strips extending across the substrate may be used to detect changes in the configuration of the substrate, since an electrical characteristic of the EAP changes when the EAP shape is changed. In another embodiment, the display includes a memory shape plastic that changes size and/or shape upon application of voltage thereto. In another application, changes in the shape and/or size of the display induced by an external force, for example, by a configurable frame or by a user, may be detected by monitoring electrical changes in the EAP. Detection of changes in the configuration of the display may be used by the display controller to control the display, for example, to address the pixels, as discussed below.

Figure 9:
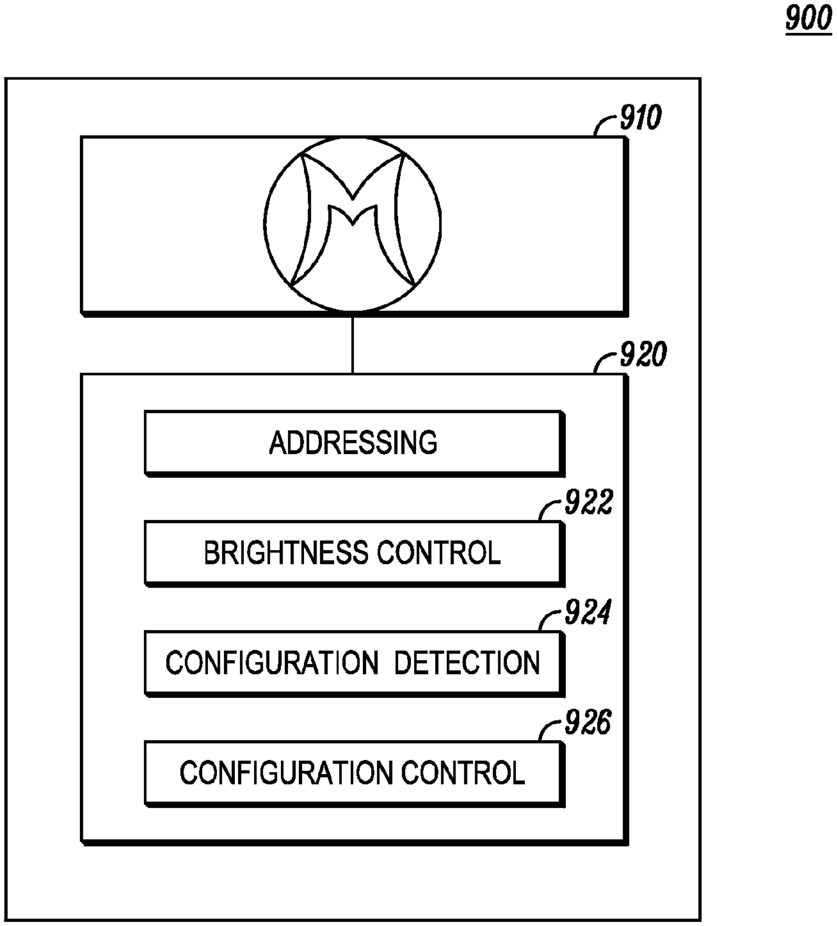
FIG. 9 illustrates a portable electronic device including a visual interface.

FIG. 9 illustrates a portable electronic device 900 comprising a display 910 and a display controller 920. In other applications, however, the device 900 is not necessarily portable. For example, the device could be integrated in another system, like an automobile. In one embodiment, the display controller is integrated with the visual interface. In another embodiment, the controller is part of the device and is coupled to the display via an interface. The display controller may be a dedicated controller or it could be a general purpose controller. The display is typically implemented as a software controlled digital device that addresses picture elements and controls brightness and contrast among other display functions known generally by those having ordinary skill in the art.

According to another aspect of the disclosure, the controller controls one or more characteristics of the visual interface based on the configuration of the viewable display area, for example, based on the shape and/or size of the viewable display area. In one embodiment, the processor includes a pixel addressing module 920 that addresses pixels based on the configuration of the visual interface and particularly based on the configuration of the viewable display area thereof. In one particular implementation, the controller enables a greater number of picture elements when the size characteristic of the viewable display area is relatively large and the controller enables a lesser number of picture elements when the size characteristic is relatively small.

In another implementation, the controller addresses a group of neighboring picture elements as a single picture element, wherein the number of neighboring picture elements in the group are dependent on the size of the viewable display area. For example, the controller may address a lesser number of neighboring picture elements in the group when the size characteristic of the display is smaller, and the controller may address a greater number of neighboring picture elements in the group when the size characteristic of the display is greater. Such an addressing scheme may provide uniform pixel density when the viewable display area is configured between large and small areas. For example, some pixels may be turned off, or not addressed, when the pixel density is relatively high.

In another embodiment, the processor includes a brightness control module 922 that controls the brightness of the display. In one implementation, the brightness of the visual interface is controlled based on the size characteristic of the viewable display area. For example, the brightness of the pixels may be increased when the visual interface has a relatively large size configuration relative to the brightness when the display has a relatively small size. Such a brightness control scheme could be used to maintain constant lumens per unit area of the display as the viewable display area changes from one configuration to another.

In another embodiment, the processor includes a detection module 924 capable of detecting a change in the configuration of the viewable display area. The controller may then control another characteristic, for example, the brightness or addressing scheme, of the visual interface in response to detecting the configuration of the viewable display area. In one embodiment, the detection module receives inputs from one or more sensors, for example, sensors that detect changes in the size or configuration of an adjustable frame that captures the visual interface. In another embodiment, the detection module detects the configuration of the viewable display area by detecting a change in an electrical property of the substrate, for example, a change in the electrical property of the EAP based substrate.

In FIG. 9, the controller also comprises a display configuration module 926 that controls the configuration, and particularly the size and/or shape, of the viewable display area. For example, the module 926 may control the configuration of the viewable display area of an EAP based display by applying a voltage to the EAP. The display configuration module may prompt configuration of the viewable display area based on input from a user, or upon the opening of an application program, or some other event. In one embodiment, the viewable display area is configured based on content displayed on the visual interface. For example, the display may be configured for a 16:9 aspect ratio to accommodate content provided by a video application or the display may be configured with a portrait configuration to display text generated by a word processing application.

While the present disclosure and the best modes thereof have been described in a manner establishing possession and enabling those of ordinary skill to make and use the same, it will be understood and appreciated that there are equivalents to the exemplary embodiments disclosed herein and that modifications and variations may be made thereto without departing from the scope and spirit of the inventions, which are to be limited not by the exemplary embodiments but by the appended claims.

What is claimed is:

1. A method in a visual interface having a plurality of picture elements disposed on a substrate, the method comprising:

configuring a viewable display area of the visual interface by expanding or contracting the substrate in at least one dimension, at least a portion of the viewable display area of the visual interface is deformed, including the plurality of picture elements that comprise an elastic characteristic, wherein the plurality of picture elements expand or contract to change a size of an image when the substrate is expanded by stretching an elastic strand and the picture elements contract when the substrate folds or collapses, and all picture elements remain viewable despite the contraction or expansion of the substrate; and controlling a characteristic of the visual interface based on the configuration of the viewable display area by enabling at least some of the picture elements of the viewable display area.

2. The method of claim 1, the viewable display area having a surface dimension, expanding or contracting the substrate in a direction substantially parallel to the surface dimension of viewable display area.

3. The method of claim 1, configuring the viewable display area includes changing a size characteristic of the viewable display area by expanding or contracting the substrate, controlling the characteristic of the visual interface includes controlling a brightness of the visual interface based on the size characteristic of the viewable display area.

4. The method of claim 1, configuring the viewable display area includes changing a size characteristic of the viewable display area by expanding or contracting the substrate, controlling the characteristic of the visual interface includes addressing a group of neighboring picture elements as a single picture element, wherein the number of neighboring picture elements in the group is dependent on the size characteristic of the viewable display area.

5. The method of claim 4, addressing a lesser number of neighboring picture elements in the group when the size characteristic of the display is smaller, and addressing a greater number of neighboring picture elements in the group when the size characteristic of the display is greater.

6. The method of claim 1, configuring the viewable display area includes changing a size characteristic of the viewable display area by expanding or contracting the substrate, controlling the characteristic of the visual interface includes enabling a greater number of picture elements when the size characteristic is relatively large and enabling a lesser number of picture elements when the size characteristic is relatively small.

7. The method of claim 1 further comprising, detecting the configuration of the viewable display area upon expanding or contracting the substrate in at least one dimension;

controlling the characteristic of the visual interface in response to detecting the configuration of the viewable display area.

8. The method of claim 7, detecting the configuration of the viewable display area by detecting a change in an electrical property of the substrate.

9. The method of claim 1, expanding or contracting the substrate in at least one dimension substantially parallel to the surface dimension of viewable display area by applying an electrical signal to the substrate.

10. The method of claim 1, configuring the viewable display area based on content displayed on the visual interface.

11. A portable electronic device comprising:

a visual interface having a plurality of addressable picture elements disposed on a surface of a substrate, a viewable display area of the visual interface is configurable by expanding or contracting the substrate in a direction substantially parallel to a surface dimension of the viewable display area to deform the viewable display area, wherein to change a size of an image, the addressable picture elements expand when the substrate is expanded by stretching an elastic strand and the addressable picture elements contract when the substrate folds or collapses; and a controller communicably coupled to the visual interface, the controller configuring a characteristic of the visual interface based on the configuration of the viewable display area.

12. The device of claim 11, the controller controlling a brightness characteristic of the visual interface based on a size configuration of the viewable display area.

13. The device of claim 11, the controller addressing a group of neighboring picture elements as a single picture element, the number of neighboring picture elements in the group dependent on a size characteristic of the viewable display area.

14. The device of claim 13, the controller addressing a lesser number of neighboring picture elements in the group when the size characteristic of the display is smaller, and the controller addressing a greater number of neighboring picture elements in the group when the size characteristic of the display is greater.

15. The device of claim 11, at least a portion of the viewable display area of the visual interface including a number of picture elements that remains unchanged when the substrate is expanded or contracted, the controller controlling the characteristic of the visual interface includes enabling a greater number of picture elements when a size of the viewable display area is relatively large and enabling a lesser number of picture elements when the size of the viewable display area is relatively small.

16. The device of claim 11 further comprising, the controller detecting the configuration of the viewable display area upon expanding or contracting the substrate;

the controller controlling the characteristic of the visual interface in response to detecting the configuration.

17. The device of claim 16, the controller detecting the configuration of the viewable display area by detecting a change in an electrical property of the substrate.

18. The device of claim 11, the controller applying an electrical signal to the substrate to control expansion and contraction of the substrate applying an electrical signal to the substrate.

19. The device of claim 11, configuring the viewable display area of the visual interface based on content displayed on the visual interface.

20. The device of claim 11, where the visual display changes to a default configuration when the device powers off.

* * * * *